United States Patent
Sun et al.

(10) Patent No.: US 10,275,099 B2
(45) Date of Patent: Apr. 30, 2019

(54) TOUCH CONTROL DEVICE, TOUCH DISPLAY DEVICE, AND DRIVING METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Ying Sun, Xiamen (CN); Yanfang Tang, Xiamen (CN); Yumin Xu, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 148 days.

(21) Appl. No.: 15/209,558

(22) Filed: Jul. 13, 2016

(65) Prior Publication Data
US 2017/0344146 A1   Nov. 30, 2017

(30) Foreign Application Priority Data

May 24, 2016   (CN) .......................... 2016 1 0350350

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0414* (2013.01); *G06F 3/0416* (2013.01); *G06F 2203/04104* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 9,182,859 | B2 | 11/2015 | Coulson et al. |
| 2007/0236466 | A1 | 10/2007 | Hotelling |
| 2008/0062147 | A1 | 3/2008 | Hotelling |
| 2011/0057899 | A1 | 3/2011 | Sleeman |
| 2014/0062933 | A1 | 3/2014 | Coulson |

(Continued)

FOREIGN PATENT DOCUMENTS

| | | |
|---|---|---|
| CN | 105068695 A | 11/2015 |
| CN | 204965387 U | 1/2016 |

(Continued)

*Primary Examiner* — Brian M Butcher
(74) *Attorney, Agent, or Firm* — Anova Law Group, PLLC

(57) ABSTRACT

A touch control device, a driving method of a touch control device, a touch display device, and a driving method of a touch control device are provided. The touch control device comprises a first electrode layer and a second electrode layer. The first electrode and the second electrode layer are electrically insulated from each other. The first electrode layer includes a plurality of mutually insulated first electrodes arranged in an array. The second electrode layer is disposed on a different layer other than the first electrode layer, and includes at least one second electrode. The first electrode is configured to detect a touch position in a first touch control time period, and the first electrode and the second electrode are configured to detect a touch force in a second touch control time period.

7 Claims, 10 Drawing Sheets

(56) References Cited

U.S. PATENT DOCUMENTS

2017/0235414 A1* 8/2017 Ding .................. G06F 3/0416
                                                           345/174
2017/0344150 A1* 11/2017 Zou ..................... G06F 3/044

FOREIGN PATENT DOCUMENTS

| CN | 205038622 U    | 2/2016  |
|----|----------------|---------|
| CN | 205068355 U    | 3/2016  |
| CN | 105549251 A    | 5/2016  |
| DE | 112007000350 T5| 12/2008 |
| EP | 2410407 A1     | 1/2012  |

* cited by examiner

TOUCH CONTROL DEVICE, TOUCH DISPLAY DEVICE, AND DRIVING METHOD THEREOF

CROSS-REFERENCES TO RELATED APPLICATIONS

This application claims priority of Chinese Patent Application No. 201610350350.X, filed on May 24, 2016, the entire contents of which are hereby incorporated by reference and made a part of specification.

FIELD OF THE INVENTION

The present disclosure generally relates to the field of touch control technology and, more particularly, to a touch control device, a touch display device, and driving method thereof.

BACKGROUND

With the accelerated development of science and technology, electronic devices that possess touch control functions are increasingly and widely applied in people's daily life and work, which bring huge convenience, and thus become an important and integral tool in human-computer interaction.

Current touch control devices often comprise a plurality of driving electrodes and a plurality of sensing electrodes. The driving electrodes and the sensing electrodes are alternately arranged, and accordingly, the detection of a touch position can be realized via a change in capacitance between the driving electrode and sensing electrode. However, the current touch control devices may only realize the detection of a touch position, but may fail to detect the corresponding touch force.

The disclosed touch control device, touch display device, and driving method thereof are directed to solve one or more problems set forth above and other problems.

BRIEF SUMMARY OF THE DISCLOSURE

One aspect of the present disclosure provides a touch control device. The touch control device comprises a first electrode layer, and a second electrode layer. The first electrode and the second electrode are mutually insulated from each other. The first electrode layer includes a plurality of mutually insulated first electrodes arranged in an array. The second electrode layer is disposed on a different layer other than the first electrode layer, and includes at least one second electrode. The first electrode is configured to detect a touch position in a first touch control time period. The first electrode and the second electrode are configured to detect a touch force in a second touch control time period.

Another aspect of the present disclosure provides a driving method of a touch control device. The touch control device comprises a first electrode layer and a second electrode layer. The first electrode and the second electrode are mutually insulated from each other. The first electrode layer includes a plurality of mutually insulated first electrodes arranged in an array. The second electrode layer is disposed on a different layer other than the first electrode layer, and includes at least one second electrode. The first electrode layer is configured to detect a touch position in a first time period. The first electrode and the second electrode are configured to detect a touch force in a second touch control time period. The driving method comprises a pulsed signal provided to the first electrodes and a constant voltage signal provided to the second electrodes in the second touch control time period.

Another aspect of the present disclosure provides a touch display device. The touch display device comprises an array substrate, a color film substrate, and a display panel. The color film substrate is arranged opposite to the array substrate. The display panel comprises a first electrode layer and a second electrode layer. The first electrode and the second electrode are mutually insulated from each other. The first electrode layer includes a plurality of mutually insulated first electrodes arranged in an array. The second electrode layer is disposed on a different layer other than the first electrode layer, and includes at least one second electrode. The first electrode is configured to detect a touch position in a first touch control time period, and the first electrode and the second electrode are configured to detect a touch force in a second touch control time period. The first electrode layer is disposed on a surface of the color film substrate that is far from the array substrate, and the second electrode layer is sandwiched between the array substrate and the color film substrate.

Another aspect of the present disclosure provides a driving method of a touch display device. The touch display device comprises an array substrate, a color film substrate and a display panel. The color film substrate is arranged opposite to the array substrate. The display panel comprises a first electrode layer and a second electrode layer. The first electrode layer includes a plurality of mutually insulated first electrodes arranged in an array, and is electrically insulated from each other. The second electrode layer is disposed on a different layer other than the first electrode layer, and includes at least one second electrode. The first electrode is configured to detect a touch position in a first touch control time period, and the first electrode and the second electrode are configured to detect a touch force in a second touch control time period. The first electrode layer is disposed on a surface of the color film substrate that is far from the array substrate, and the second electrode layer is sandwiched between the array substrate and the color film substrate. The driving method comprises a pulsed voltage signal provided to the first electrodes and a constant voltage signal provided to the second electrodes in the second touch control time period, such that the touch force is detected.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

As discussed above, the current touch control device may only detect a touch position, but may fail to detect the corresponding touch force, i.e., how hard a user is pressing. A detection of the corresponding touch force is highly desired to enable various force-sensitive operations in the touch control device.

The present disclosure provides an improved touch control device and driving method thereof, an improved touch display device and driving method thereof. The disclosed touch control device, touch display device and driving method thereof may not only realize the detection of a touch location, but also realize the detection of a touch force.

Figure 1:
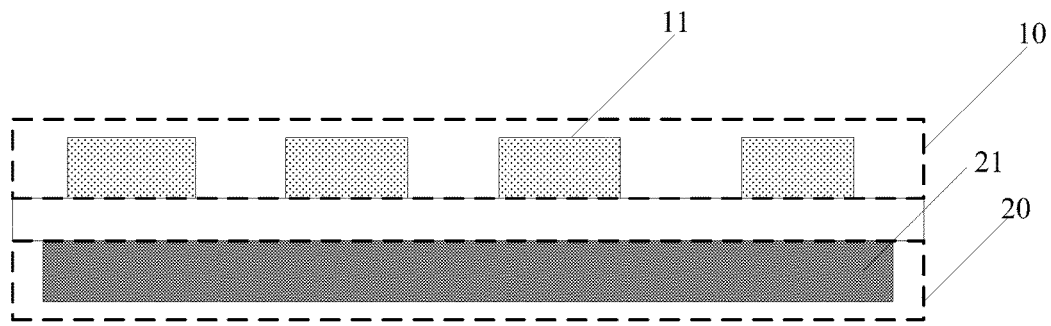
FIG. 1 illustrates a cross-sectional view of an exemplary touch control device consistent with disclosed embodiments.
Figure 2:
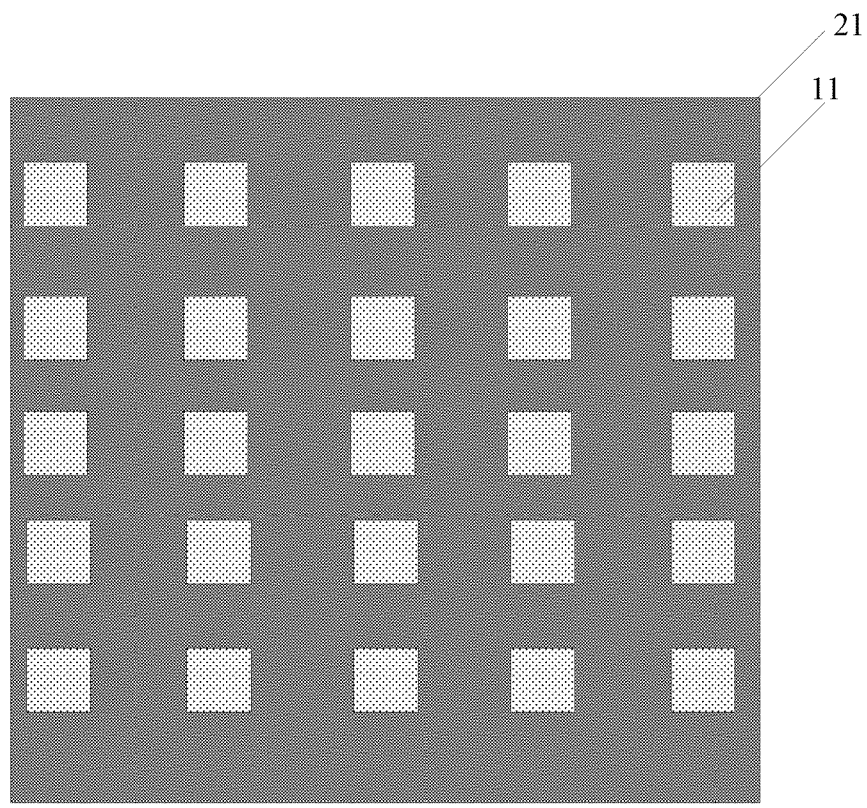
FIG. 2 illustrates a top view of another exemplary touch control device consistent with disclosed embodiments.

FIG. 1 illustrates a cross-sectional view of an exemplary touch control device, and FIG. 2 illustrates a top view of another exemplary touch control device consistent with disclosed embodiments. As shown in FIG. 1 and FIG. 2, the touch control device may comprise a first electrode layer 10 and a second electrode layer 20. The first electrode layer 10 may further comprise a plurality of mutually insulated first electrodes 11 arranged in an array. The second electrode layer 20 may be disposed on a different layer other than the first electrode layer 10, and may comprise at least one second electrode 21.

In particular, the first electrode layer 10 and the second electrode layer 20 may be electrically insulated from each other. The first electrodes 11 may be applied to detect a touch position in a first touch control time period, and the first electrodes 11 and second electrodes 21 may be simultaneously applied to detect a touch force in a second touch control time period.

In one embodiment, the plurality of mutually insulated first electrodes 11 arranged in the array may be used as self-capacitance electrodes in a first touch control time period, thus realizing the detection of a touch position based on the self-capacitance detection principle. In another embodiment, the plurality of mutually insulated first electrodes 11 arranged in the array may be used as driving electrodes of the mutual capacitance electrodes in a first touch control time period, thus realizing the detection of a touch position based on mutual capacitance detection principle.

Figure 3:
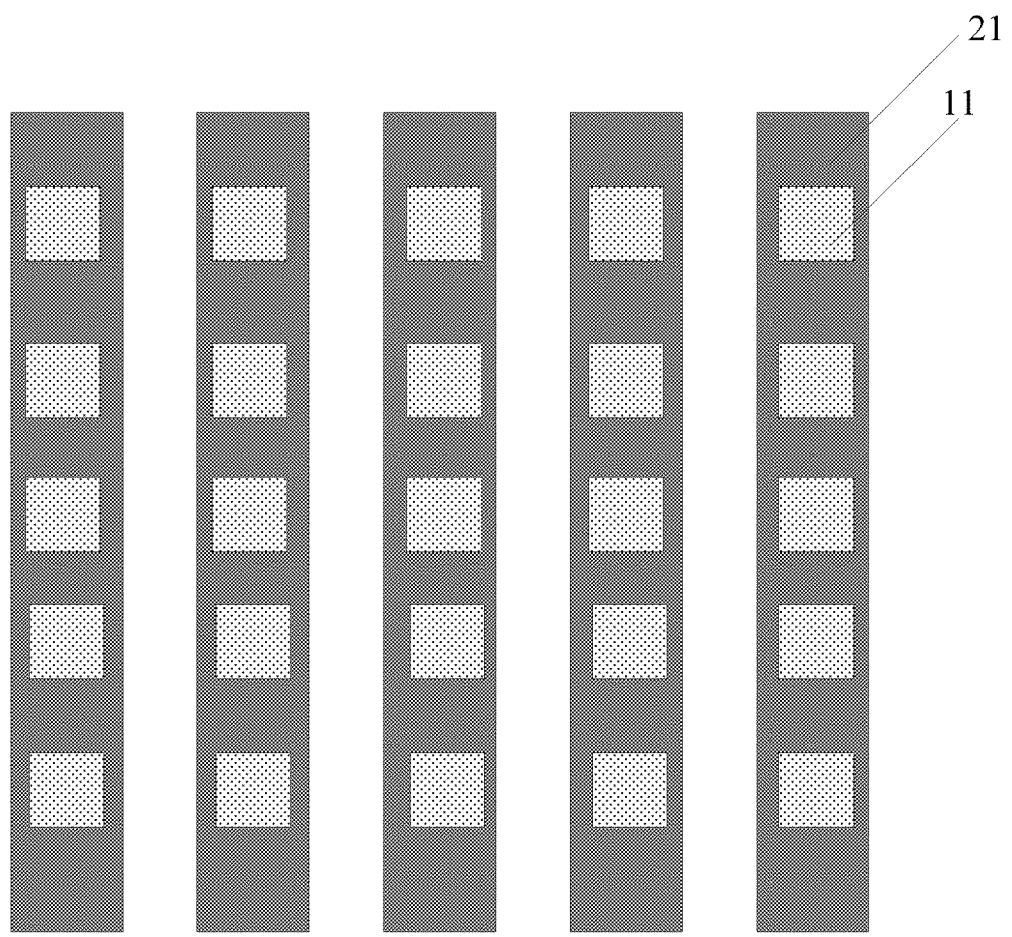
FIG. 3 illustrates a top view of another exemplary touch control device consistent with disclosed embodiments.

On the other hand, the second electrode layer 20 may have various shapes. In one embodiment, the second electrode layer 20 may be a planar electrode or a sheet electrode. For example, as shown in FIG. 2, the second electrode layer 20 may only include one second electrode 21. In another embodiment, the second electrode layer 20 may comprise a plurality of second electrodes 21, and the corresponding structure is shown in FIG. 3. The shape and the number of the second electrodes 21 and the shape and the number of the first electrodes shown in FIG. 2 and FIG. 3 are only illustrative purposes, and are not intended to limit the scope of the present disclosure.

FIG. 3 illustrates a top view of another exemplary touch control device consistent with disclosed embodiments. The similarities between FIG. 2 and FIG. 3 are not repeated here, while certain differences may be explained. As shown in FIG. 3, the plurality of mutually insulated first electrodes 11 arranged in the array may be used as driving electrodes of the mutual capacitance electrodes in a first touch control time period, thus realizing the detection of a touch position based on mutual capacitance detection principle. The second electrode layer 20 may comprise a plurality of mutually insulated second electrodes 21 extending in a first direction. The second electrodes 21 may be arranged in parallel and arranged in a second direction. For example, as shown in FIG. 3, the first direction may be a vertical direction and the second direction may be a horizontal direction, and the first direction may be perpendicular to the second direction. The second electrodes 21 may be used as sensing electrodes in mutual capacitance electrodes in a first touch control time period. The second electrodes 21 and the first electrodes 11 are simultaneously used to detect a touch position.

Figure 4:
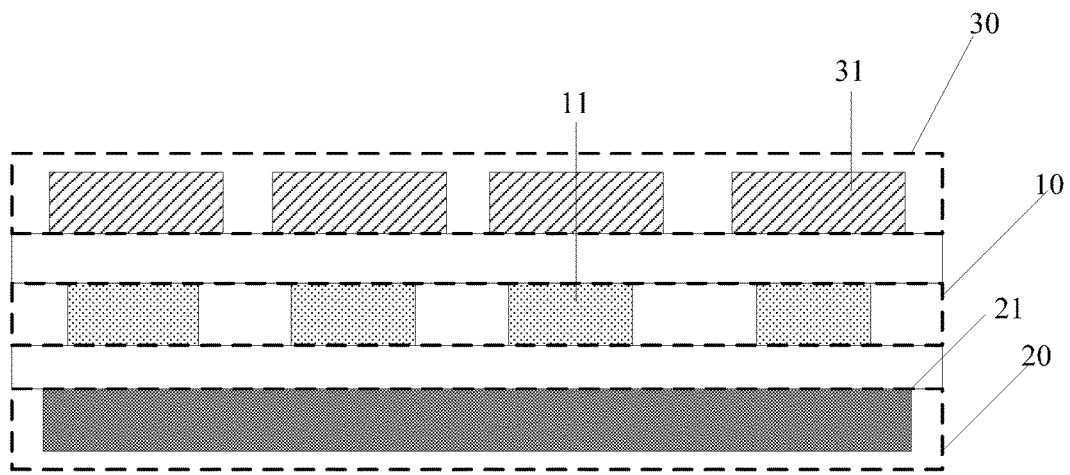
FIG. 4 illustrates a cross-sectional view of another exemplary touch control device consistent with disclosed embodiments.

FIG. 4 illustrates a cross-sectional view of another exemplary touch control device consistent with disclosed embodiments. The similarities between FIGS. 2-3 and FIG. 4 are not repeated here, while certain differences may be explained. As shown in FIG. 4, in addition to the first electrode layer 10 and the second electrode layer 20, the touch control device may also comprise a third electrode layer 30, which may include a plurality of third electrodes 31. The third electrodes 31 may extend in the first direction and may be electrically insulated from the first electrodes 11. The third electrodes 31 may be used as sensing electrodes in mutual capacitance electrodes in a first touch control time period, and may be applied to detect a touch position together with the first electrodes 11.

In one embodiment, the second electrode layer 20 may be a planar electrode. In another embodiment the second electrode layer 20 may include a plurality of second electrodes 21. The second electrodes 21 may be electrically connected to each other, and may have various shapes. For example, the plurality of second electrodes 21 may be a plurality of striped electrodes that are electrically connected to each other, or a plurality of block electrodes that are electrically connected to each other. The shape and the number of the second electrodes 21 shown in FIG. 4 are only illustrative purposes, and are not intended to limit the scope of the present disclosure.

Figure 5:
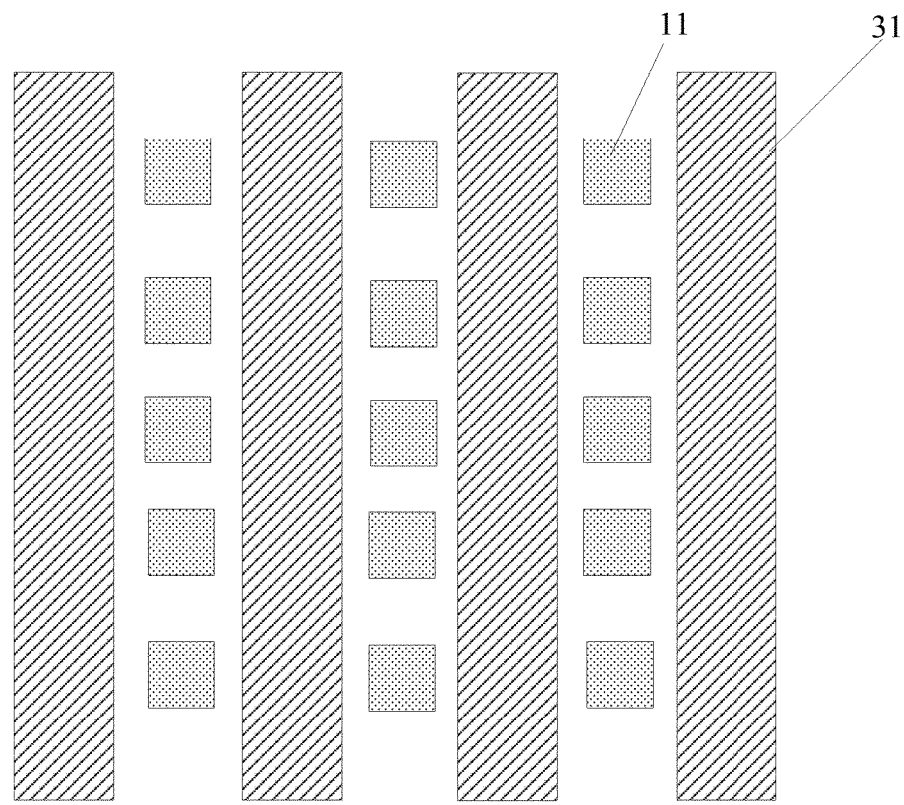
FIG. 5 illustrates a top view of another exemplary touch control device consistent with disclosed embodiments.

Further, as shown in FIG. 4, the third electrode 31 may be disposed on a different layer other than the first electrode 11. In another embodiment, the third electrodes 31 may be disposed on a same layer as the first electrode 11, thus, the thickness of the touch control device may be reduced. The corresponding structure is shown in FIG. 5, which is not repeated here.

Figure 6:
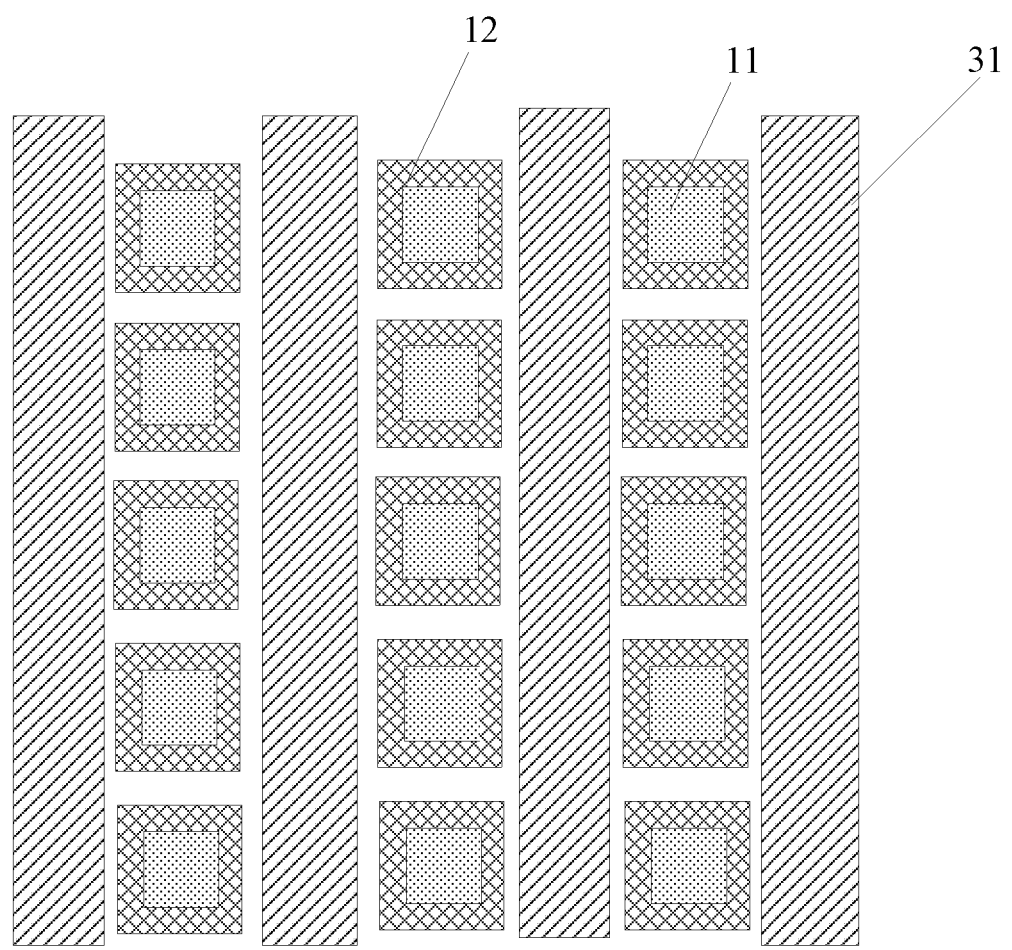
FIG. 6 illustrates a top view of another exemplary touch control device consistent with disclosed embodiments.

FIG. 6 illustrates a top view of another exemplary touch control device consistent with disclosed embodiments. As shown in FIG. 6, in addition to the first electrodes 11 and the third electrodes 31, the touch control device may also comprise a plurality of mutually insulated fourth electrodes 12 disposed on a same layer as the first electrodes 11.

In particular, each fourth electrode 12 may include at least one through-hole. The first electrode 11 may be disposed onside the through-hole and may be insulated from the fourth electrodes 12. The fourth electrodes 12 may be the driving electrodes in mutual capacitance electrodes in a first control touch control time period. That is, the first electrodes 11 and the fourth electrodes 12 may be simultaneously used as the driving electrodes in the mutual capacitance electrodes, while the second electrodes 21 may be used as the sensing electrodes in the mutual capacitance electrodes. It should be noted that, the fourth electrodes 12 may have the same driving signal as the first electrode 11 disposed on the corresponding through-hole.

Figure 7:
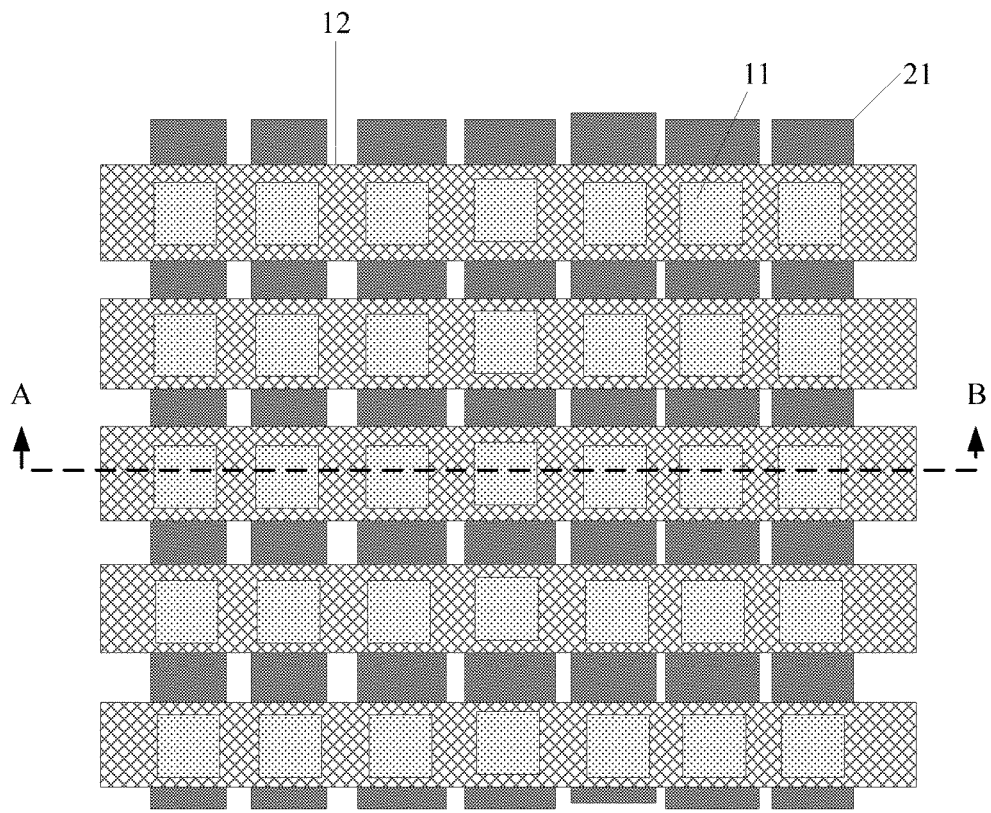
FIG. 7 illustrates a top view of another exemplary touch control device consistent with disclosed embodiments.
Figure 8:
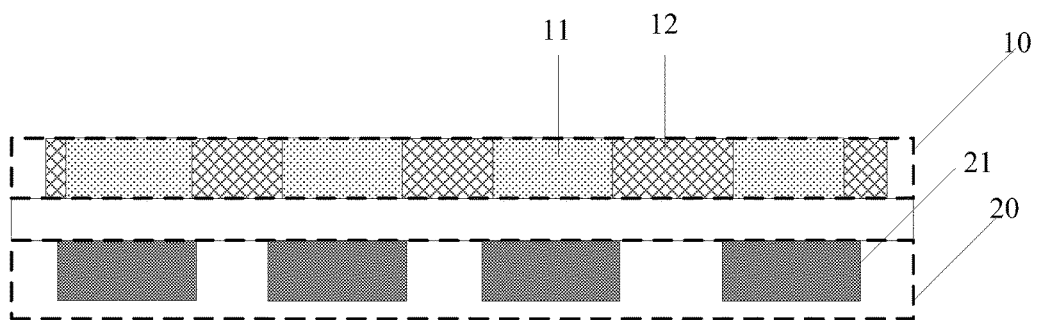
FIG. 8 illustrates an AB cross-sectional view of another exemplary touch control device in FIG. 7 consistent with disclosed embodiments.
Figure 9:
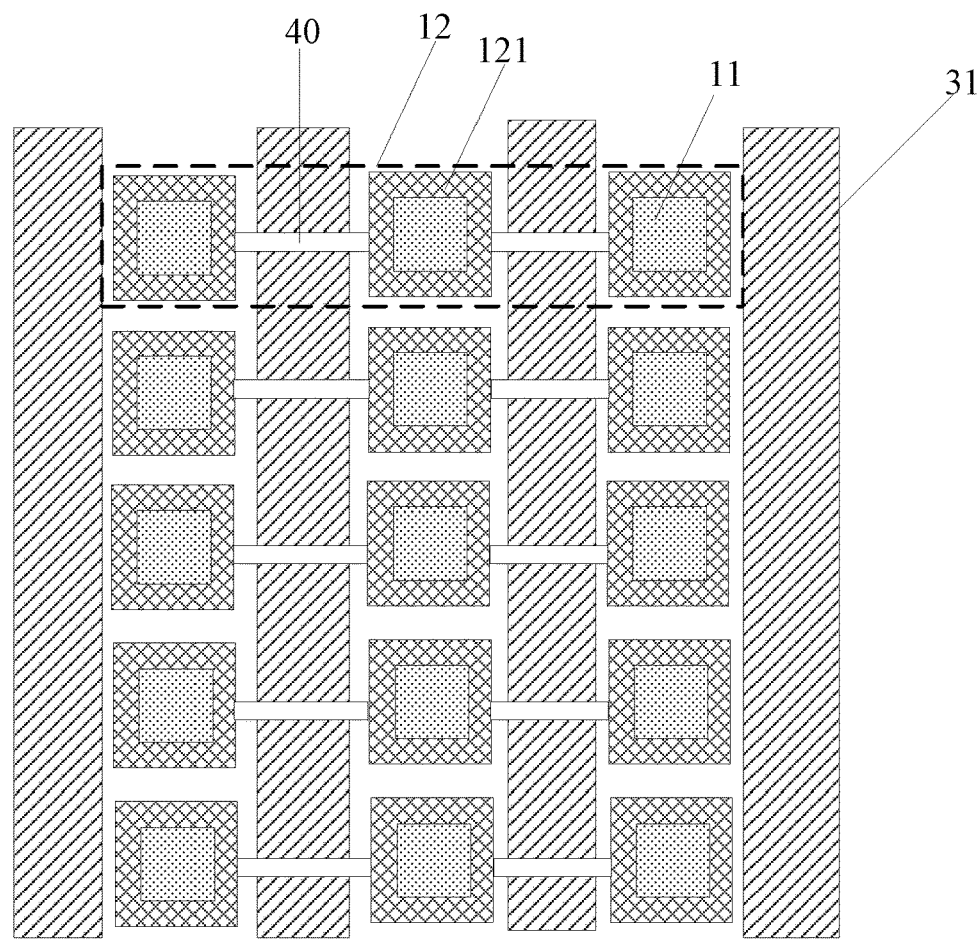
FIG. 9 illustrates a top view of another exemplary touch control device consistent with disclosed embodiments.

Further, the fourth electrode 12 may have various shapes. In one embodiment, the fourth electrode 12 may be a striped electrode, and the corresponding structure is shown in FIGS. 7-8. In another embodiment, the fourth electrode 12 may be a block electrode, and the corresponding structure is shown in FIG. 9. In another embodiment, the fourth electrode 12 may be a zig-zag electrode.

It should be noted that, the shape and the number of the fourth electrodes 12, the shape and the number of the second electrodes 21, and the shape and the number of the first electrodes 11 shown in FIGS. 6-8 are only for illustrative purposes and are not intended to limit the scope of the present disclosure. The shape and the number of the fourth electrodes 12, the shape and the number of the second electrodes 21, the shape and the number of the first electrodes 11, and the shape and the number of the third electrodes 31 shown in FIG. 9 are only for illustrative purposes and are not intended to limit the scope of the present disclosure FIG. 7 illustrates a top view of another exemplary touch control device consistent with disclosed embodiments. FIG. 8 illustrates an AB cross-sectional view of another exemplary touch control device in FIG. 7 consistent with disclosed embodiments. As shown in FIG. 7 and FIG. 8, the second electrodes 21 and the fourth electrodes 12 may be striped electrodes, and the second electrodes 21 may be used as the sensing electrodes in mutual capacitance electrodes. The second electrodes 21 may be arranged in parallel and may extend in the first direction, and the fourth electrodes 12 may be arranged in parallel and may extend in the second direction. For example, as shown in FIG. 7, the first direction may be a vertical direction and the second direction may be a horizontal direction, and the first direction may be perpendicular to the second direction.

In the direction perpendicular to the surface of the touch control device, the first electrodes 11 may be disposed at crossing positions of the second electrodes 21 and the fourth electrodes 12. Thus, a capacitance may be formed between the first electrodes 11 and the second electrodes 21, which may be adopted to detect the touch force.

FIG. 9 illustrates a top view of another exemplary touch control device consistent with disclosed embodiments. As shown in FIG. 9, the third electrodes 31 may be disposed on a same layer as the first electrodes 11, and the third electrodes 31 may be applied as sensing electrodes in mutual capacitance electrodes in the first touch control time period. Each fourth electrode 12 may further comprise a plurality of the fourth sub-electrodes 121 that are electrically connected to each other. A fourth sub-electrode 121 may be disposed between two adjacent third electrodes 31, and any two adjacent fourth sub-electrodes 121 may be electrically connected to each other via a bridge 40.

Figure 10:
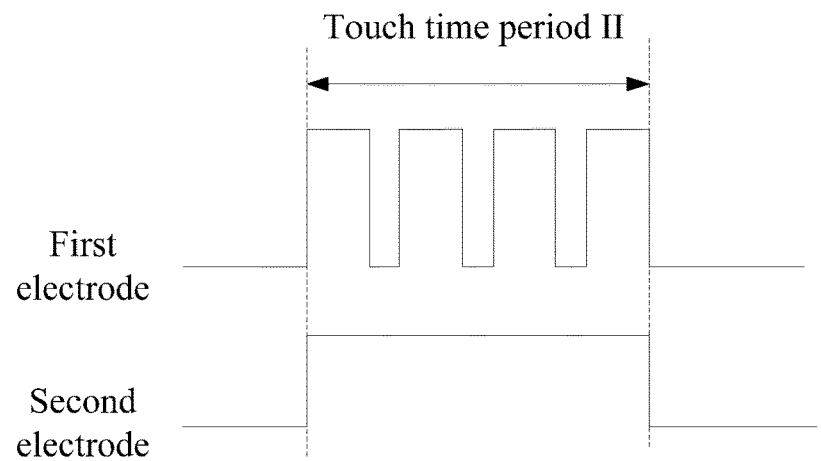
FIG. 10 illustrates an exemplary driving scheme of an exemplary touch control device driving method consistent with disclosed embodiments.

The disclosed invention also provides a driving method of the touch control device. FIG. 10 illustrates an exemplary driving scheme of an exemplary touch control device driving method consistent with disclosed embodiments. As shown in FIG. 10, the driving scheme of the touch control device may include a second touch control time period. In the second touch control time period, a pulsed voltage signal may be provided to the first electrodes 11, and a constant voltage signal may be provided to the second electrodes 21 (S1), such that the detection of a touch force may be realized.

Figure 11:
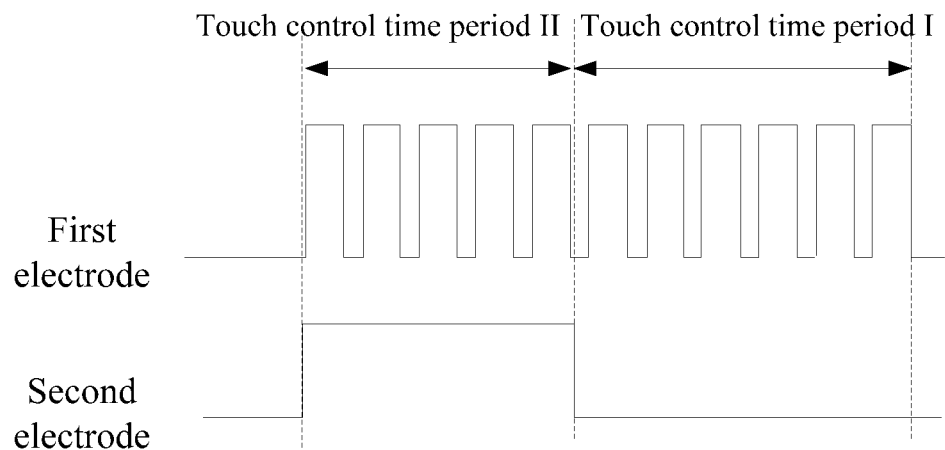
FIG. 11 illustrates an exemplary driving scheme of another exemplary touch control device driving method consistent with disclosed embodiments.

In another embodiment, the first electrodes 11 may be the driving electrodes in mutual capacitance electrodes, and the second electrodes 21 may be the sensing electrodes in mutual capacitance electrodes, and the corresponding driving scheme is shown in FIG. 11. FIG. 11 illustrates an exemplary driving scheme of another exemplary touch control device driving method consistent with disclosed embodiments.

As shown in FIG. 11, the driving scheme of the touch control device may include a second touch control time period and a first touch control time period. At the second touch control time period, a pulsed voltage signal may be provided to the first electrodes 11, and a constant voltage signal may be provided to the second electrodes 21, such that the detection of a touch force may be realized (S1). At the first touch control time period, a touch scanning voltage signal may be provided to the first electrodes 11, such that the voltage signal of the second electrodes 21 may be detected and the detection of a touch position may be realized accordingly (S2).

Figure 12:
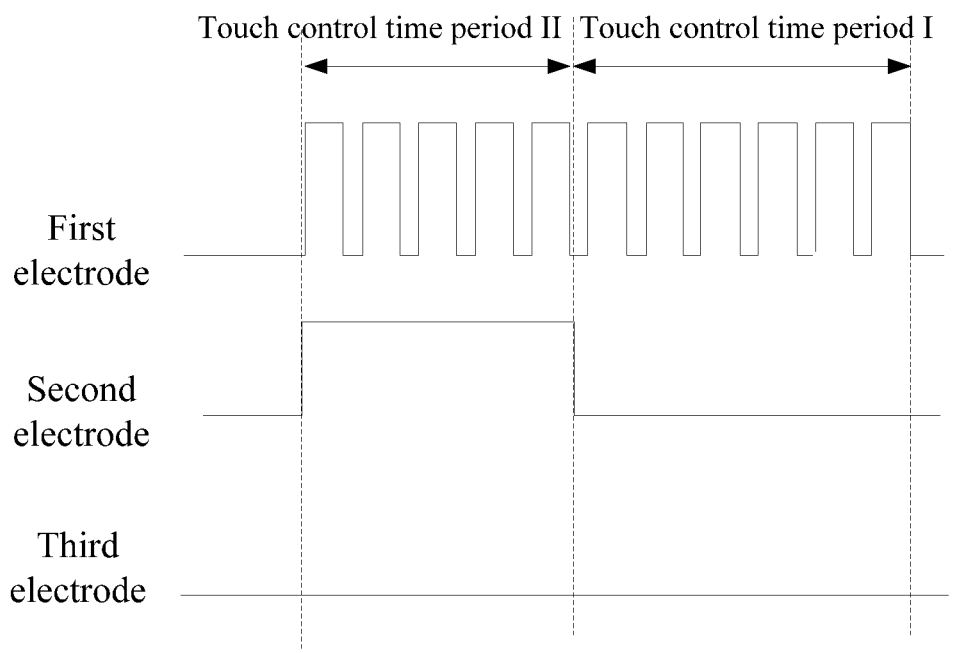
FIG. 12 illustrates an exemplary driving scheme of another exemplary touch control device driving method consistent with disclosed embodiments.

In another embodiment, the first electrodes 11 may be the driving electrodes in mutual capacitance electrodes, and the third electrodes 31 may be the sensing electrodes in mutual capacitance electrodes, and the corresponding driving scheme is shown in FIG. 12. FIG. 12 illustrates an exemplary driving scheme of another exemplary touch control device driving method consistent with disclosed embodiments.

As shown in FIG. 12, the driving scheme of the touch control device may include a second touch control time period and a first touch control time period. At the second touch control time period, a pulsed voltage signal may be provided to the first electrodes 11, and a constant voltage signal may be provided to the second electrodes 21, such that the detection of a touch force may be realized (S1). At the first touch control time period, a touch scanning voltage signal may be provided to the first electrodes 11, such that the voltage signal of the third electrodes 31 may be detected and the detection of a touch position may be realized accordingly (S3).

Figure 13:
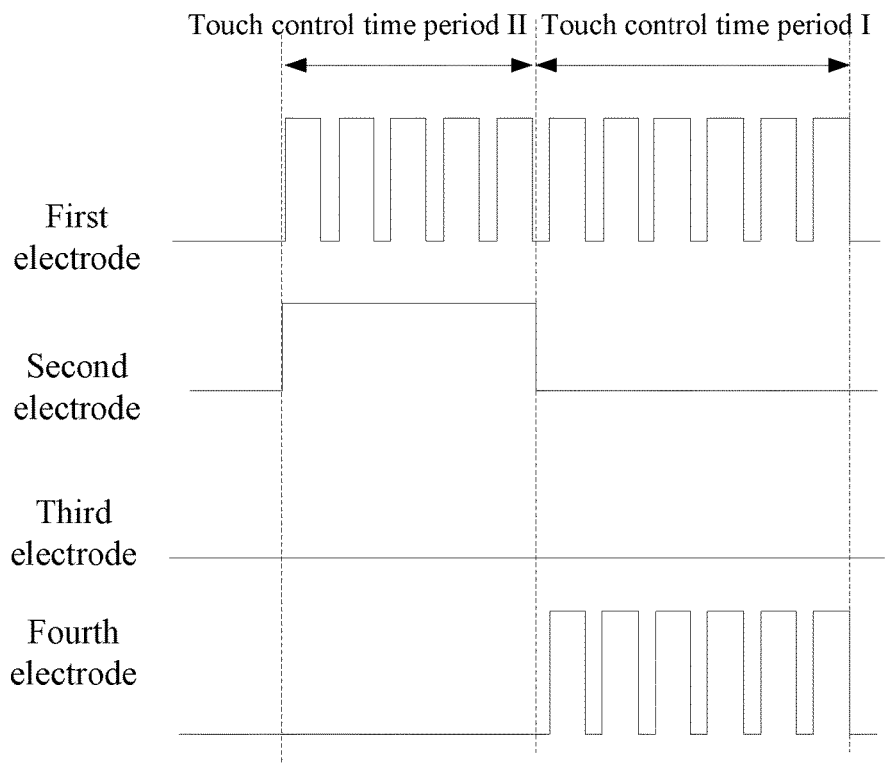
FIG. 13 illustrates an exemplary driving scheme of another exemplary touch control device driving method consistent with disclosed embodiments.

In another embodiment, the touch control panel corresponding to the driving scheme shown in FIGS. 10-12 may further include the fourth electrodes 12, and the corresponding driving scheme is shown in FIG. 13. FIG. 13 illustrates an exemplary driving scheme of another exemplary touch control device driving method consistent with disclosed embodiments.

As shown in FIG. 13, the driving scheme of the touch control device may include a second touch control time period and a first touch control time period. The second touch control time period of the driving scheme shown in FIG. 13 may be similar to the second touch control time period of the driving scheme shown in FIGS. 10-12. That is, at the second touch control time period, a pulsed voltage signal may be provided to the first electrodes 11, and a constant voltage signal may be provided to the second electrodes 21, such that the detection of a touch force may be realized (S1).

Compared to the first touch control time period in the driving scheme shown in FIGS. 10-12, the second touch control time period of the driving scheme shown in FIG. 13 may further include providing a touch scanning voltage signal to the fourth electrodes 12 (S4). The fourth electrodes 12 may be provided with a same touch scanning voltage signal as the first electrode 11 disposed on the corresponding through-hole.

In the disclosed embodiments, the touch control device and driving method thereof may include a first electrode layer 10 and a second electrode layer 20. The first electrode layer 10 may comprise a plurality of mutually insulated first electrodes 11, and the second electrode layer 20 may be disposed on a different layer other than the first electrode layer 10 and may comprise at least one second electrode 21. In particular, the first electrode layer 10 may be electrically insulated from the second electrode layer 20. The first electrodes 11 may be applied to detect a touch position in a first touch control time period, and the first electrodes 11 and the second electrodes 21 may be simultaneously used to detect a touch force in a second touch control time period. Thus, the touch control device and driving method thereof may realize the detection of a touch position as well as a touch force.

Figure 14:
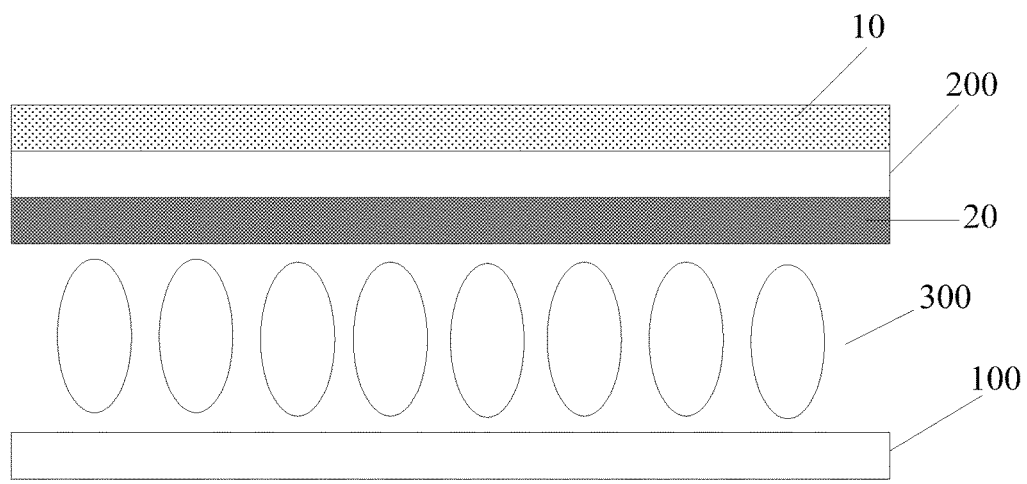
FIG. 14 illustrates a cross-sectional view of an exemplary touch display device consistent with disclosed embodiments.

The present disclosure further provides an improved touch display device. FIG. 14 illustrates a cross-sectional view of an exemplary touch display device consistent with disclosed embodiments. The touch display device may include any of the disclosed touch control devices. Further, the touch display device may be any appropriate type of touch display device having a display function and a touch function, such as plasma display panel (PDP) touch display device, field emission display (FED) touch display device, liquid crystal display (LCD) touch display device, organic light-emitting diode (OLED) touch display device, light-emitting diode (LED) touch display device, quantum dots (QDs) touch display device, electrophoretic touch display device or other types of touch display device.

In one embodiment, as shown in FIG. 14, the touch display device may be a LCD touch display device. As shown in FIG. 14, this touch display device may comprise an array substrate 100 and a color film substrate 200 arranged opposite to the array substrate 100, and a liquid crystal layer 300 sandwiched between the array substrate 100 and the color film substrate 200.

In the touch control device included in the touch display device, the first electrode layer may be disposed on one side of the color film substrate 200 that is far from the array substrate 100, and the second electrode layer 20 may be sandwiched between the array substrate 100 and the color film substrate 200. In one embodiment, as shown in FIG. 14, the second electrode layer 20 may be disposed on a surface of the color film substrate 200 that is facing the array substrate 100. In another embodiment, the second electrode layer 20 may be disposed on a surface of the array substrate 100 that is facing the color film substrate 200.

Further, the array substrate 100 may include a plurality of data lines, a plurality of scanning lines, and a plurality of pixel electrodes. The data lines may cross or intersect the scanning lines, defining a plurality of pixel units. The pixel units may be any appropriate pixel units or sub-pixel units of the touch display panel for displaying images or image elements. Each pixel unit may comprise a control switch, for example, a thin film transistor (TFT). The control switch may have a gate electrode electrically connected to the scanning line, a source electrode electrically connected to the data line, and a drain electrode electrically connected to the pixel electrode. Thus, when the touch display panel is in an operation status, each control switch may be switched on or off through the scanning line.

In particular, when the control switch is switched on, the driving signal provided by the data lines may be transmitted to the pixel electrodes, and the corresponding pixel units may be able to display an image or an image electrode. In one embodiment, the extension direction of data lines may be parallel to the first direction, and the extension direction of the scanning lines may be parallel to the second direction. The first direction may be perpendicular to the second direction. In another embodiment, the extension direction of data lines may be parallel to the second direction while the extension direction of the scanning lines may be parallel to the first direction. The first direction may be perpendicular to the second direction.

As discussed above, the touch display device shown in FIG. 14 may include the first electrode layer 10 and the second electrodes 20. The first electrode layer 10 may include a plurality of first electrodes 11, and the second electrode layer 20 may include a plurality of second electrodes 21. In one embodiment, the first electrodes 11 may be the driving electrodes in mutual capacitance electrodes, and the second electrodes 21 may be the sensing electrodes in mutual capacitance electrodes. In the display stage, the first electrodes may also be used as the common electrodes, i.e., the first electrodes may be multiplexed as the common electrodes in the display stage and the driving electrodes in the touch stage. Thus, the thickness of the touch display device may be further reduced.

In another embodiment, the first electrodes 11 may be the driving electrodes in mutual capacitance electrodes, and the third electrodes 31 may be the sensing electrodes in mutual capacitance electrodes. In the display stage, the second electrodes 21 may be used as the common electrodes.

In another embodiment, the first electrodes 11 may be the driving electrodes in mutual capacitance electrodes, and the third electrodes 31 may be the sensing electrodes in mutual capacitance electrodes. In the display stage, the first electrodes 11 may be used as the common electrodes.

In another embodiment, the first electrodes 11 may be the driving electrodes in mutual capacitance electrodes, and the third electrodes 31 may be the sensing electrodes in mutual capacitance electrodes. In the display stage, the second electrodes 21 and the first electrodes 11 may be simultaneously used as the common electrodes.

In another embodiment, the touch display device may further comprise the fourth electrodes 12, which may also be used as the common electrodes in the display stage.

Figure 15:
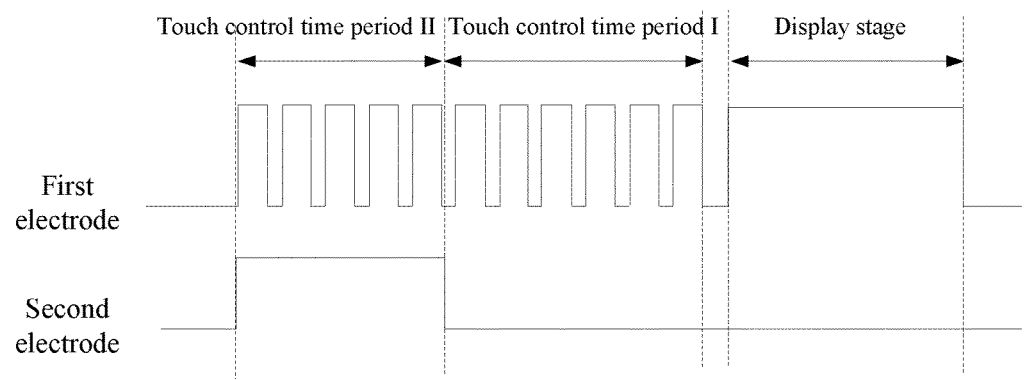
FIG. 15 illustrates an exemplary driving scheme of an exemplary touch display device driving method consistent with disclosed embodiments.

This invention also provides a driving method of the touch display device. FIG. 15 illustrates an exemplary driving scheme of an exemplary touch display device driving method consistent with disclosed embodiments. As shown in FIG. 15, the driving scheme of the touch control device may include a second touch control time period, a first touch control time period, and a display stage. In the second touch control time period, a pulsed voltage signal may be provided to the first electrodes 11, and a constant voltage signal may be provided to the second electrodes 21 (S5), such that the detection of a touch force may be realized.

In one embodiment, the first electrodes 11 may be the driving electrodes in mutual capacitance electrodes, the second electrodes 21 may be the sensing electrodes in mutual capacitance electrodes, and the corresponding driving scheme may include a first touch control time period, a second touch control time period and a display stage. In the first touch control time period, a touch scanning voltage signal is provided to the first electrode 11, and the voltage signal of the second electrodes 21 is detected, such that the detection of a touch position can be realized (S6). In the display stage, a common voltage signal is provided to the first electrodes 11.

Figure 16:
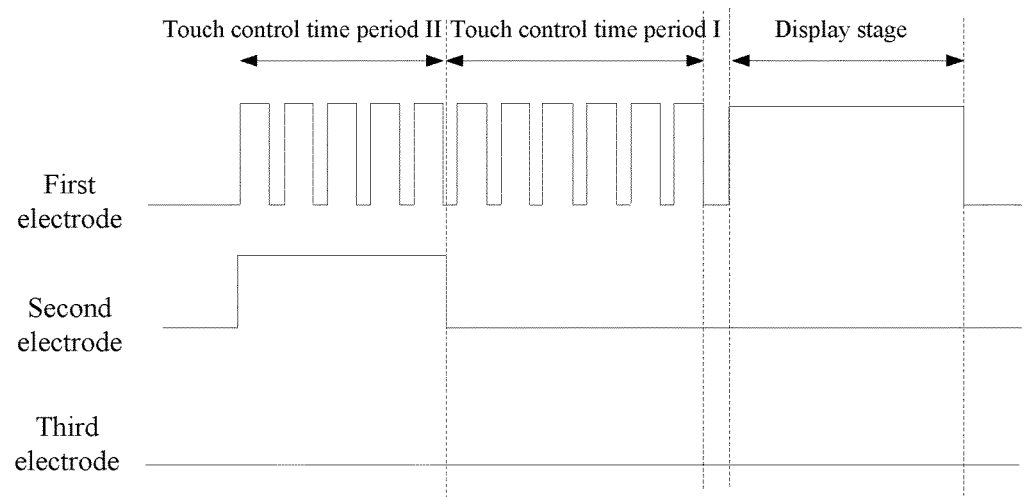
FIG. 16 illustrates an exemplary driving scheme of another exemplary touch display device driving method consistent with disclosed embodiments.
Figure 17:
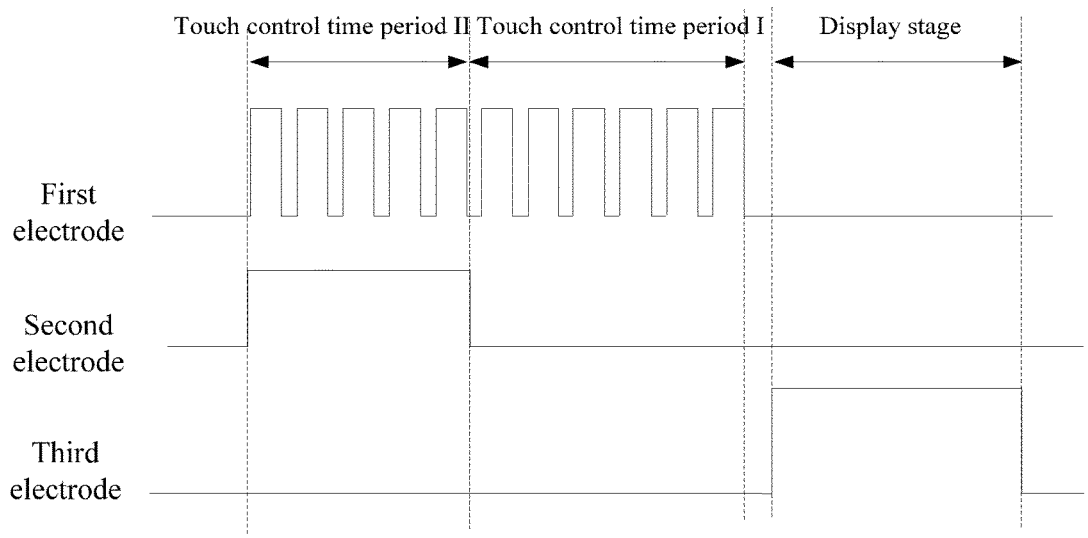
FIG. 17 illustrates an exemplary driving scheme of another exemplary touch display device driving method consistent with disclosed embodiments.

In another embodiment, the first electrodes 11 may be the driving electrodes in mutual capacitance electrodes, the third electrodes 31 may be the sensing electrodes in mutual capacitance electrodes, and corresponding driving scheme is shown in FIG. 16 and FIG. 17. FIG. 16 illustrates an exemplary driving scheme of an exemplary touch display device driving method consistent with disclosed embodiments. FIG. 17 illustrates an exemplary driving scheme of another exemplary touch display device driving method consistent with disclosed embodiments.

As shown in FIG. 16 and FIG. 17, the driving scheme of the touch control device may include a second touch control time period, a first touch control time period, and a display stage. In the first touch control time period, a touch scanning voltage signal is provided to the first electrodes 11, and the voltage signal of the third electrodes 31 is detected, such that the detection of a touch position may be realized (S8). At the display stage, a common voltage signal is provided to the first electrodes 11 and/or the third electrodes 31 (S9).

Figure 18:
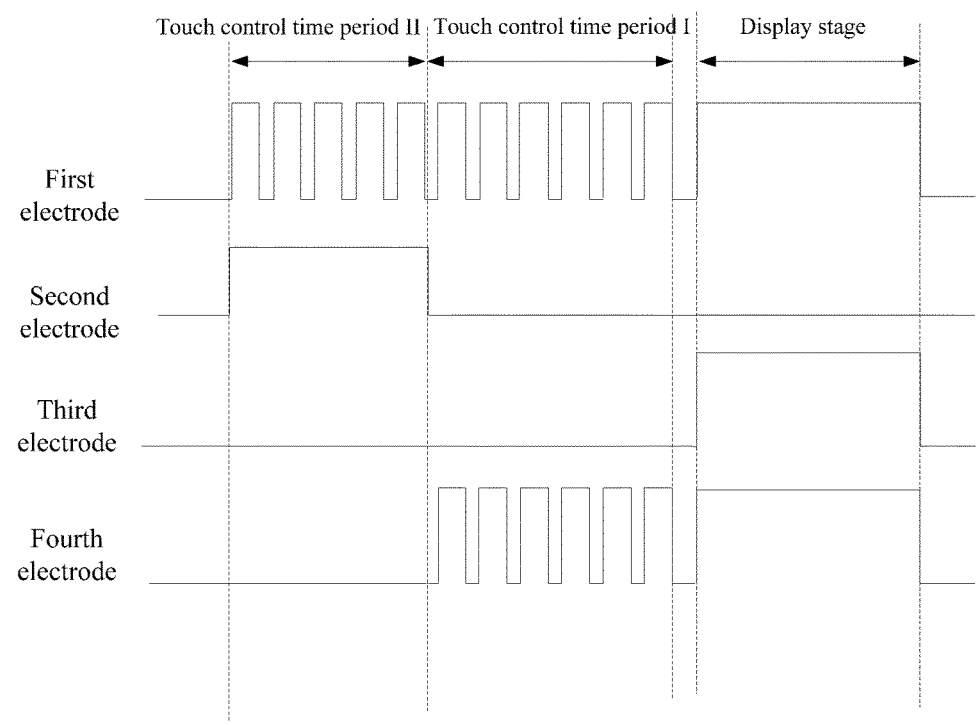
FIG. 18 illustrates an exemplary driving scheme of another exemplary touch display device driving method consistent with disclosed embodiments.

In one embodiment, the touch display device may also comprise the fourth electrodes 12, and the corresponding driving scheme is shown in FIG. 18. FIG. 18 illustrates an exemplary driving scheme of an exemplary touch display device driving method consistent with disclosed embodiments.

As shown in FIG. 18, the driving scheme of the touch control device may include a second touch control time period, a first touch control time period, and a display stage. At the first touch control time period, a touch scanning voltage signal may be provided to the fourth electrodes 12, wherein the fourth electrodes 12 show the same touch scanning voltage signal as the first electrodes 11 in the through-hole of the fourth electrode (S10). At the display stage, a common voltage signal may be provided to the fourth electrodes 12.

As shown in FIGS. 15-18, a high level signal may be used to represent the common voltage signal, and the high level signal may be merely used to differ from the case in which no signal is provided in a first touch control time period and a second touch control time period. The high level signal may not restrict the voltage amplitude of the common voltage signal. In practical applications, the voltage amplitude of the common voltage signal may be zero, or may be substantially low.

The disclosed touch display device may comprise any of the disclosed touch control devices. The disclosed touch control device may comprise: a first electrode layer 10 and a second electrode layer 20. The first electrode layer 10 may comprise a plurality of mutually insulated first electrodes 11, and the second electrode layer 20 may be disposed on a different layer other than the first electrode layer 10 and may comprise at least one second electrode 21. The first electrode layer 10 and the second electrode layer 20 may be electrically insulated from each other, the first electrodes 11 may be used to detect a touch position in a first touch control time period, while the first electrodes 11 and the second electrode 21 may be simultaneously used to detect a touch force in a second touch control time period. Thus the touch display device and driving method thereof may realize the detection of a touch position as well as a touch force, and various force-sensitive operations may be enabled in the touch control devices accordingly.

The above specification to be published tends to educate professionals in this field to realize or use this invention. Various modifications of these embodiments are apparent to professionals in this field, and the basic principles defined in this paper can be realized in other embodiments without being separated from the spirit or dimension of this invention. As a consequence, this invention will not be limited to the embodiments shown in this paper, however, tend to satisfy the widest range that is consistent with the principles and novel ideas made common by this invention.

What is claimed is:

1. A touch control device, comprising:
a first electrode layer including a plurality of mutually insulated first electrodes arranged in an array;
a second electrode layer disposed on a different layer other than the first electrode layer, and including at least one second electrode; and
a plurality of third electrodes extending in a second direction and disposed on a same layer as the first electrodes, wherein:
the first electrode layer and the second electrode layer are electrically insulated from each other,
a first electrode of the plurality of first electrodes is configured to detect a touch position in a first touch control time period,
the first electrode of the plurality of first electrodes and the at least one second electrode are configured to detect a touch force in a second touch control time period,
in the first touch control time period, the at least one second electrode is configured to detect the touch position together with the first electrodes, wherein the first electrodes are driving electrodes in mutual capacitance electrodes and a touch scanning voltage signal is provided to the first electrodes, and the at least one second electrode is a sensing electrode in the mutual capacitance electrodes and a voltage signal is detected at the at least one second electrode, a third electrode of the plurality of third electrodes includes at least one through-hole, the first electrode of the plurality of first electrodes is disposed on the at least one through-hole and electrically insulated from the third electrode of the plurality of third electrodes, and in the first touch control time period, the third electrodes are the driving electrodes in the mutual capacitance electrodes.

2. The touch control device according to claim 1, wherein:
the second electrode layer includes a plurality of mutually insulated second electrodes extending along a first direction; and in the first touch control time period, the second electrodes are sensing electrodes in the mutual capacitance electrodes, and are configured to detect the touch position together with the first electrodes.

3. The touch control device according to claim 1, wherein:
the at least one second electrode is the sensing electrode in the mutual capacitance electrodes in the first touch control time period;

the at least one second electrode and the third electrodes are striped electrodes; and in a direction perpendicular to a surface of the touch control device, the first electrodes are disposed at crossing positions of the at least one second electrode and the third electrodes.

4. A driving method of a touch control device comprising a first electrode layer including a plurality of mutually insulated first electrodes arranged in an array; and a second electrode layer disposed on a different layer other than the first electrode layer, and including at least one second electrode, wherein the first electrode layer and the second electrode layer are electrically insulated from each other, a first electrode of the plurality of first electrodes is configured to detect a touch position in a first touch control time period, and the first electrode of the plurality of first electrodes and the at least one second electrode are configured to detect a touch force in a second touch control time period, wherein the driving method comprises:

in the second touch control time period, providing a pulsed voltage signal to the first electrodes and providing a constant voltage signal to the at least one second electrode, such that the touch force is detected, wherein the first electrode of the plurality of first electrodes is a driving electrode and the at least one second electrode is a sensing electrode in mutual capacitance electrodes, respectively, the driving method further comprises:

in the first touch control time period, providing a touch scanning voltage signal to the first electrode of the plurality of first electrodes and detecting a voltage signal of the at least one second electrode, such that the touch position is detected, and wherein the touch control device further comprises a plurality of third electrodes extending in a second direction and disposed on a same layer as the first electrodes, wherein a third electrode of the plurality of third electrodes includes at least one through-hole, the first electrode of the plurality of first electrodes is disposed on the at least one through-hole and electrically insulated from the third electrode of the plurality of third electrodes, the driving method further comprises:

in a first touch detection stage, providing the touch scanning voltage signal to the third electrode of the plurality of third electrodes, wherein the third electrode of the plurality of third electrodes is provided with a same touch scanning voltage signal as the first electrode of the plurality of first electrodes disposed in the at least one through-hole of the third electrode of the plurality of third electrodes.

5. A touch display device, comprising:
an array substrate;
a color film substrate arranged opposite to the array substrate; and
a display panel comprising a first electrode layer including a plurality of mutually insulated first electrodes arranged in an array; and a second electrode layer disposed on a different layer other than the first electrode layer, and including at least one second electrode, wherein the first electrode layer and the second electrode layer are electrically insulated from each other, a first electrode of the plurality of first electrodes is configured to detect a touch position in a first touch control time period, and the first electrode of the plurality of first electrodes and the at least one second electrode are configured to detect a touch force in a second touch control time period, wherein the first electrode layer is disposed on a surface of the color film substrate that is far from the array substrate, and the second electrode layer is disposed between the array substrate and the color film substrate, and in a touch stage, the first electrode of the plurality of first electrodes is a driving electrode and a touch scanning voltage signal is provided to the first electrodes, and the at least one second electrode is a sensing electrode in mutual capacitance electrodes and a voltage signal is detected at the at least one second electrode, in a display stage, the first electrode of the plurality of first electrodes is a common electrode, and wherein the touch display device further comprises a plurality of third electrodes extending in a second direction and disposed on a same layer as the first electrodes, a third electrode of the plurality of third electrodes includes at least one through-hole, the first electrode of the plurality of first electrodes is disposed on the at least one through-hole and electrically insulated from the third electrode of the plurality of third electrodes, wherein:

in the display stage, the third electrode of the plurality of third electrodes is the common electrode.

6. The touch display device according to claim 5, wherein the array substrate further includes a plurality of data lines extending a first direction and a plurality of scanning lines extending in a second direction; and the plurality of data lines cross the plurality of scanning lines to define a plurality of pixel units.

7. A driving method of a touch display device comprising an array substrate; a color film substrate arranged opposite to the array substrate; and a display panel comprising a first electrode layer including a plurality of mutually insulated first electrodes arranged in an array; and a second electrode layer disposed on a different layer other than the first electrode layer, and including at least one second electrode, wherein the first electrode layer and the second electrode layer are electrically insulated from each other, a first electrode of the plurality of first electrodes is configured to detect a touch position in a first touch control time period, and the first electrode of the plurality of first electrodes and the at least one second electrode are configured to detect a touch force in a second touch control time period, wherein the first electrode layer is disposed on a surface of the color film substrate that is far from the array substrate, and the second electrode layer is disposed between the array substrate and the color film substrate, the driving method comprises:

in the second touch control time period, providing a pulsed voltage signal to the first electrodes and providing a constant voltage signal to the at least one second electrode, such that the touch force is detected, wherein the first electrode of the plurality of first electrodes is a driving electrode and the at least one second electrode is a sensing electrode in mutual capacitance electrodes, respectively, the driving method further comprises:

in the first touch control time period, providing a touch scanning voltage signal to the first electrode of the plurality of first electrodes and detecting a voltage signal of the at least one second electrode, such that the touch position is detected, wherein the first electrode of the plurality of first electrodes is a driving electrode and the at least one second electrode is a sensing electrode in mutual capacitance electrodes, respectively, the driving method further comprises:

in a display stage, providing a common voltage signal to the first electrode of the plurality of first electrodes, and wherein the touch display device further comprises a plurality of third electrodes extending in a second direction and disposed on a same layer as the first electrodes, wherein a third electrode of the plurality of third electrodes includes at least one through-hole, the first electrode of the plurality of first electrodes is disposed on the at least one through-hole and electrically insulated from the third electrode of the plurality of third electrodes, the driving method further comprises:

in the first touch detection stage, providing the touch scanning voltage signal to the third electrode of the plurality of third electrodes, wherein the third electrode of the plurality of third electrodes is provided with a same touch scanning voltage signal as the first electrode of the plurality of first electrodes disposed in the at least one through-hole of the third electrode of the plurality of third electrodes; and in the display stage, providing the common voltage signal to the third electrode of the plurality of third electrodes.

* * * * *